US 12,550,283 B2

(12) United States Patent
Ma et al.

(10) Patent No.: US 12,550,283 B2
(45) Date of Patent: Feb. 10, 2026

(54) MODULAR DESIGN FOR TRAY CARRYING AIR MOVER AND DRIVE BACKPLANE

(71) Applicant: Dell Products L.P., Round Rock, TX (US)

(72) Inventors: Liang-Chun Ma, Taipei (TW); Yi-Chang Chen, New Taipei (TW); Ching-Yuan Wang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 18/538,007

(22) Filed: Dec. 13, 2023

(65) Prior Publication Data
US 2025/0203802 A1 Jun. 19, 2025

(51) Int. Cl.
*H05K 7/14* (2006.01)
*H05K 7/20* (2006.01)

(52) U.S. Cl.
CPC ....... *H05K 7/1487* (2013.01); *H05K 7/20736* (2013.01)

(58) Field of Classification Search
CPC . G06F 1/187; G06F 1/185; G06F 1/20; G06F 1/186; H05K 7/1487; H05K 7/20727; H05K 5/0291; H05K 7/20172; H05K 5/0065; H05K 7/1427; H05K 7/1438; H05K 7/1418; G11B 33/128; G11B 33/022

USPC .... 361/679.37, 679.48, 679.02, 679.33, 752, 361/788, 796

See application file for complete search history.

(56) References Cited

U.S. PATENT DOCUMENTS

| | | | |
|---|---|---|---|
| 2006/0171110 A1* | 8/2006 | Li | G11B 33/128 |
| 2011/0007464 A1* | 1/2011 | Leigh | H05K 7/1487 |
| | | | 361/679.01 |
| 2015/0382499 A1* | 12/2015 | Chiasson | H05K 7/1487 |
| | | | 361/679.33 |
| 2018/0143670 A1* | 5/2018 | Amin-Shahidi | G11B 33/126 |
| 2023/0324963 A1* | 10/2023 | Wu | G06F 1/185 |
| 2024/0314966 A1* | 9/2024 | Chuang | H05K 7/1489 |

* cited by examiner

Primary Examiner — Mandeep S Buttar
(74) Attorney, Agent, or Firm — Jackson Walker L.L.P.

(57) ABSTRACT

An information handling system may include a processor coupled to a motherboard, a connector mounted to the motherboard, and a drive backplane assembly comprising a drive backplane tray and a module configured to be mechanically coupled to the drive backplane tray in a tool-less manner, the module housing a backplane configured to receive and couple to a plurality of storage drives, and the backplane comprising a cable having a fixed connection to the backplane wherein the cable is configured to couple to the connector.

10 Claims, 4 Drawing Sheets

MODULAR DESIGN FOR TRAY CARRYING AIR MOVER AND DRIVE BACKPLANE

TECHNICAL FIELD

The present disclosure relates in general to information handling systems, and more particularly to a modular design for a tray carrying an air mover and drive backplane, for example a backplane for Enterprise and Data Center Standard Form Factor (EDSFF) solid state drive form factors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

EDSFF form factors are becoming ubiquitous in storage applications in information handling systems. Implementations may include a tray or carrier for carrying a drive backplane having connectors for coupling drives to the backplane, with cabling to the various connectors being fixed to the connectors and merged into a single cable that couples to a motherboard. A carrier may also include an air mover (e.g., fan or blower), which may drive airflow across drives coupled to the backplane, the air mover having its own cabling which may require coupling to the motherboard.

As component densities increase, inserting and removing components, including backplane carriers, for purposes of servicing may become increasingly cumbersome. In particular, architectures may exist where additional components (e.g., other trays and carriers) may reside between a driver backplane tray and the motherboard to which cables originating in the driver backplane tray must couple. Thus, in such architectures, the cables originating in the driver backplane tray must be connected, then the other components installed, then the driver backplane tray installed, requiring a two person operation such that one person can hold the driver backplane tray while the cables are connected to the motherboard.

SUMMARY

In accordance with the teachings of the present disclosure, the disadvantages and problems associated with existing approaches to drive backplane carriers may be reduced or eliminated.

In accordance with embodiments of the present disclosure, an information handling system may include a processor coupled to a motherboard, a connector mounted to the motherboard, and a drive backplane assembly comprising a drive backplane tray and a module configured to be mechanically coupled to the drive backplane tray in a tool-less manner, the module housing a backplane configured to receive and couple to a plurality of storage drives, and the backplane comprising a cable having a fixed connection to the backplane wherein the cable is configured to couple to the connector.

In accordance with these and other embodiments of the present disclosure, a drive backplane assembly may include a drive backplane tray and a module configured to be mechanically coupled to the drive backplane tray in a tool-less manner, the module housing a backplane configured to receive and couple to a plurality of storage drives, and the backplane comprising a cable having a fixed connection to the backplane wherein the cable is configured to couple to a connector mounted to a motherboard.

In accordance with these and other embodiments of the present disclosure, a method may include mechanically coupling a module of a drive backplane assembly to a drive backplane tray of the drive backplane assembly in a tool-less manner, wherein the module houses a backplane configured to receive and couple to a plurality of storage drives and coupling a cable having a fixed connection to the backplane to a connector mounted to a motherboard prior to mechanically coupling the module of a drive backplane assembly to the drive backplane tray.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
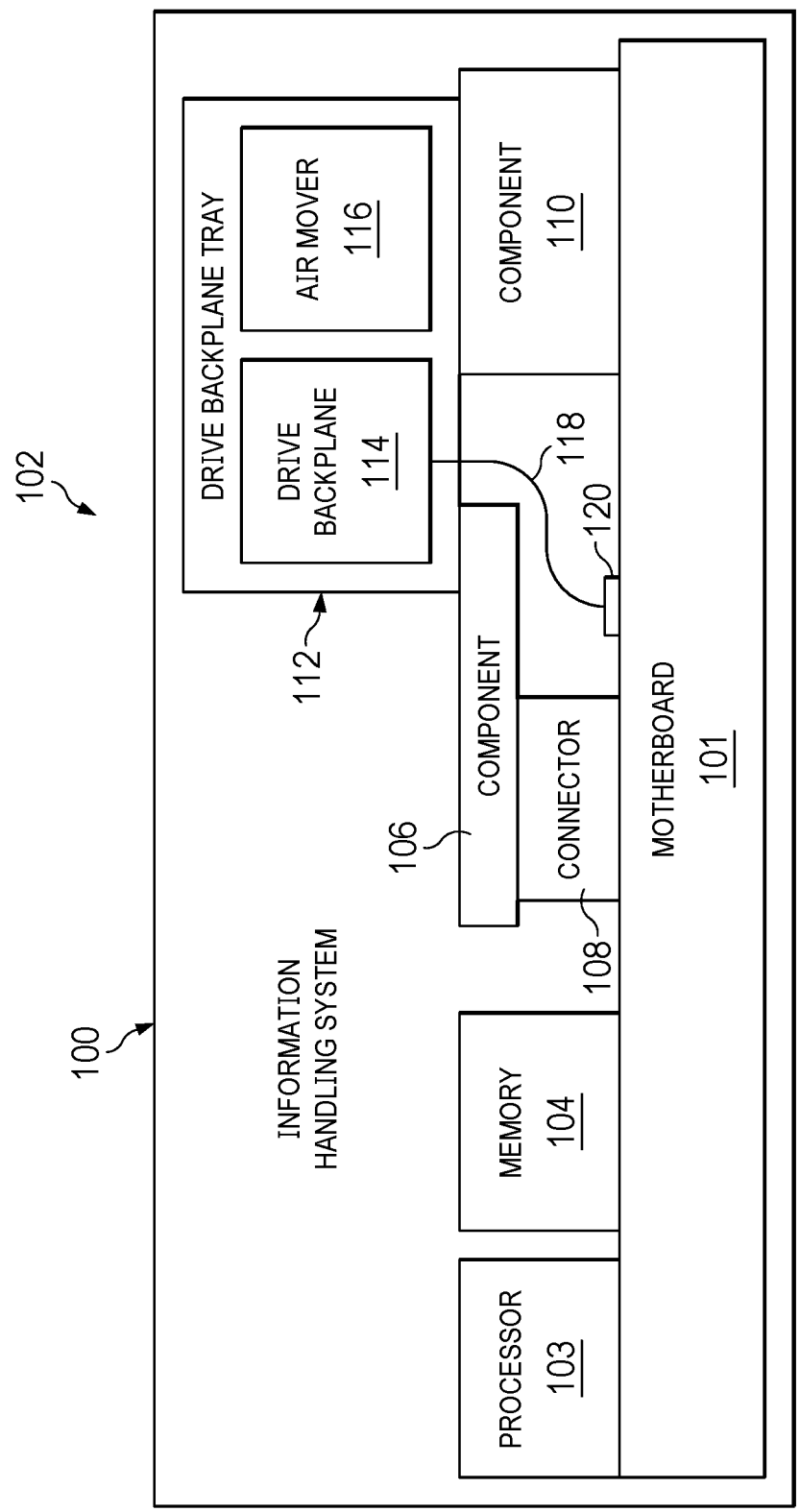
FIG. 1 illustrates a block diagram of selected components of an example information handling system, in accordance with embodiments of the present disclosure.

Preferred embodiments and their advantages are best understood by reference to FIGS. 1, 2A, 2B, and 2C, wherein like numbers are used to indicate like and corresponding parts.

For the purposes of this disclosure, an information handling system may include any instrumentality or aggregate of instrumentalities operable to compute, classify, process, retrieve, transmit, receive, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of selected components of an example information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer.

As shown in FIG. 1, information handling system 102 may include a chassis 100 that houses a motherboard 101, a processor 103 coupled to motherboard 101, a memory 104 coupled to motherboard 101, a component 106 coupled to motherboard 101 via a connector 108, another component 110 coupled to motherboard 101, and a drive backplane assembly comprising a drive backplane tray 112 housing a drive backplane 114 coupled to motherboard 101 via a cable 118 and a connector 120 of motherboard 101, and an air mover 116.

Chassis 100 may include any suitable housing or enclosure configured to house the various components of information handling system 102, and may be constructed from metal, plastic, and/or any other suitable material.

Motherboard 101 may comprise a circuit board configured to provide structural support for one or more information handling resources of information handling system 102 and/or electrically couple one or more of such information handling resources to each other and/or to other electric or electronic components external to information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource, memory system 104, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise dynamic random access memory (DRAM).

Component 106 may comprise any suitable information handling resource. In some embodiments, component 106 may comprise a tray or housing. As shown in FIG. 1, electrical and electronic components of component 106 may be coupled to motherboard 101 via connector 108.

Component 110 may comprise any suitable information handling resource. In some embodiments, component 110 may comprise a tray or housing. Although not shown in FIG. 1, component 110 may be coupled to motherboard 101 via a connector, cable, and/or any other suitable manner.

Drive backplane tray 112 may comprise any suitable system, device, or apparatus configured to house, enclose, and/or mechanically retain drive backplane 114 and air mover 116. Accordingly, drive backplane tray 112 may be constructed of metal, plastic, and/or any other suitable materials and may include mechanical features for housing, enclosing, and/or mechanically retaining drive backplane 114 and air mover 116.

Drive backplane 114 may comprise a circuit board and may be configured to couple (e.g., via suitable connectors)

to one or more storage drives (e.g., solid state storage drives). Drive backplane 114 may also couple to connector 120 mounted on motherboard 101 via a cable 118, and thus may serve as an electrical and/or electronic interface between motherboard 101 and storage drives coupled to drive backplane 114.

Air mover 116 may be any mechanical or electro-mechanical system, apparatus, or device operable to move air and/or other gases. In certain embodiments, air mover 116 may draw cool air into chassis 101 from the outside, expel warm air from inside chassis 101, and/or move air across one or more heatsinks (not explicitly shown) internal to chassis 101 to cool one or more information handling resources of information handling system 102.

In addition to motherboard 101, processor 103, memory 104, component 106, component 110, drive backplane tray 112, drive backplane 114, air mover 116, cable 118, and connector 120, information handling system 102 may include one or more other information handling resources.

Figure 2A:
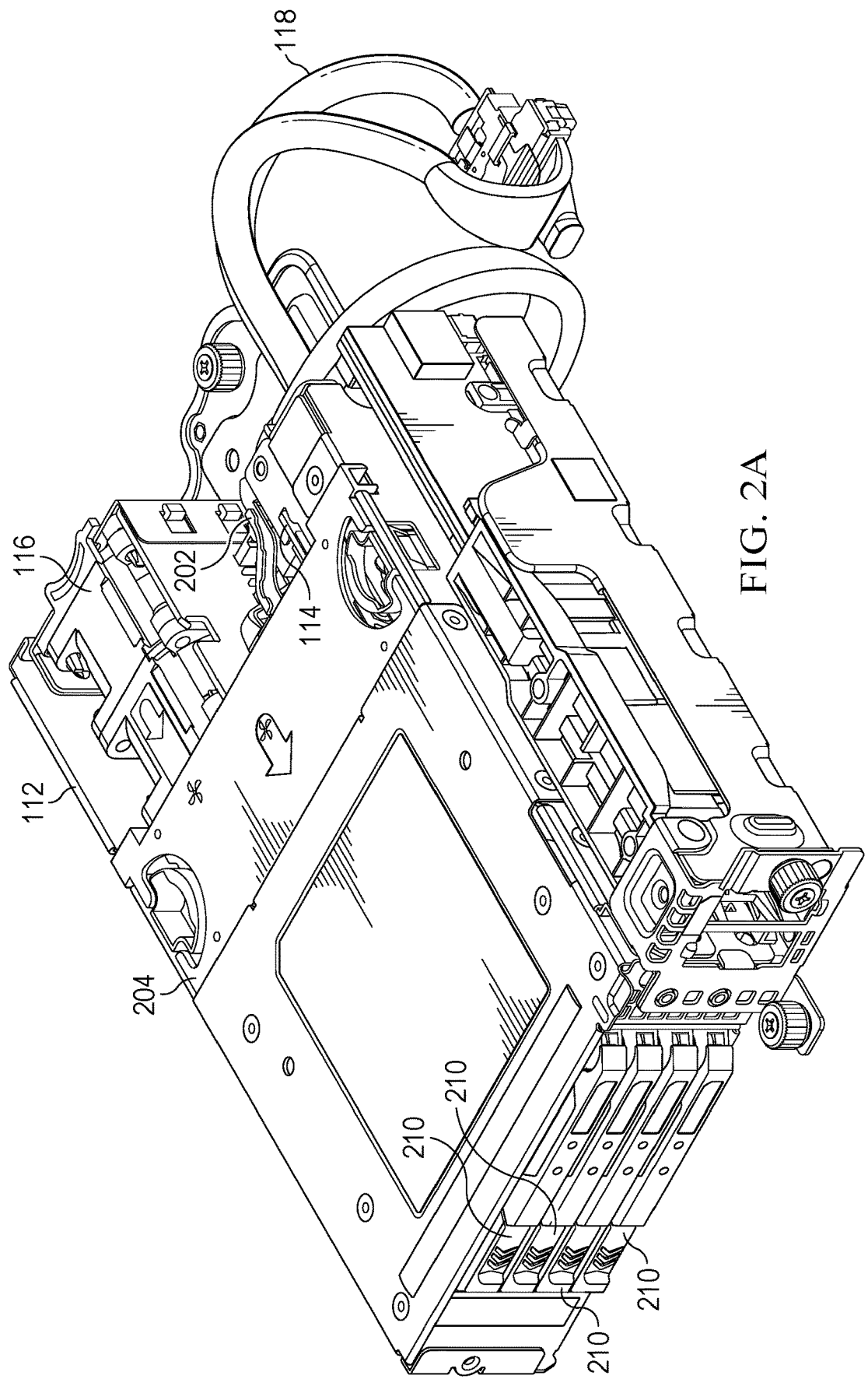
FIG. 2A illustrates an isometric assembled perspective view of an example drive backplane assembly, in accordance with embodiments of the present disclosure.
Figure 2B:
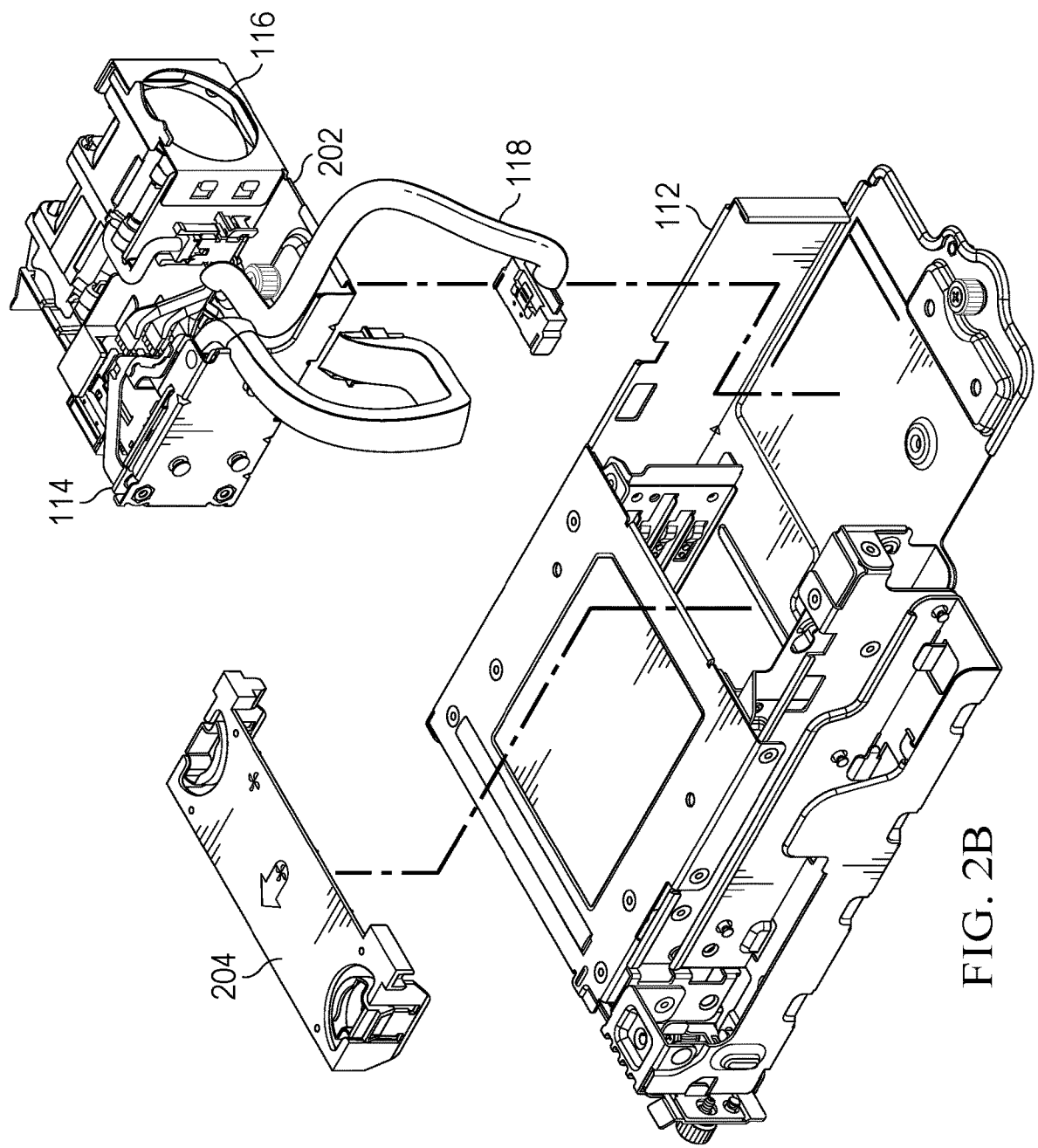
FIG. 2B illustrates an isometric exploded perspective view of an example drive backplane assembly, in accordance with embodiments of the present disclosure.

FIG. 2A illustrates an isometric assembled perspective view of an example drive backplane assembly, in accordance with embodiments of the present disclosure. FIG. 2B illustrates an isometric exploded perspective view of the example drive backplane assembly, in accordance with embodiments of the present disclosure.

As shown in FIGS. 2A and 2B, the drive backplane assembly may include drive backplane tray 112, a backplane/air mover module 202 for carrying drive backplane 114 and air mover 116, and an air shroud 204 (e.g., for guiding airflow generated by air mover 116), with cable 118 extending from connectors of drive backplane 114 to which drives 210 may be coupled. As shown in FIGS. 2A and 2B, drive backplane tray 112, backplane/air mover module 202, and air shroud 204 may be readily removable modular components, such that backplane/air mover module 202 and air shroud 204 may be readily inserted into and readily removed from drive backplane tray 112 without the use of tools.

Figure 2C:
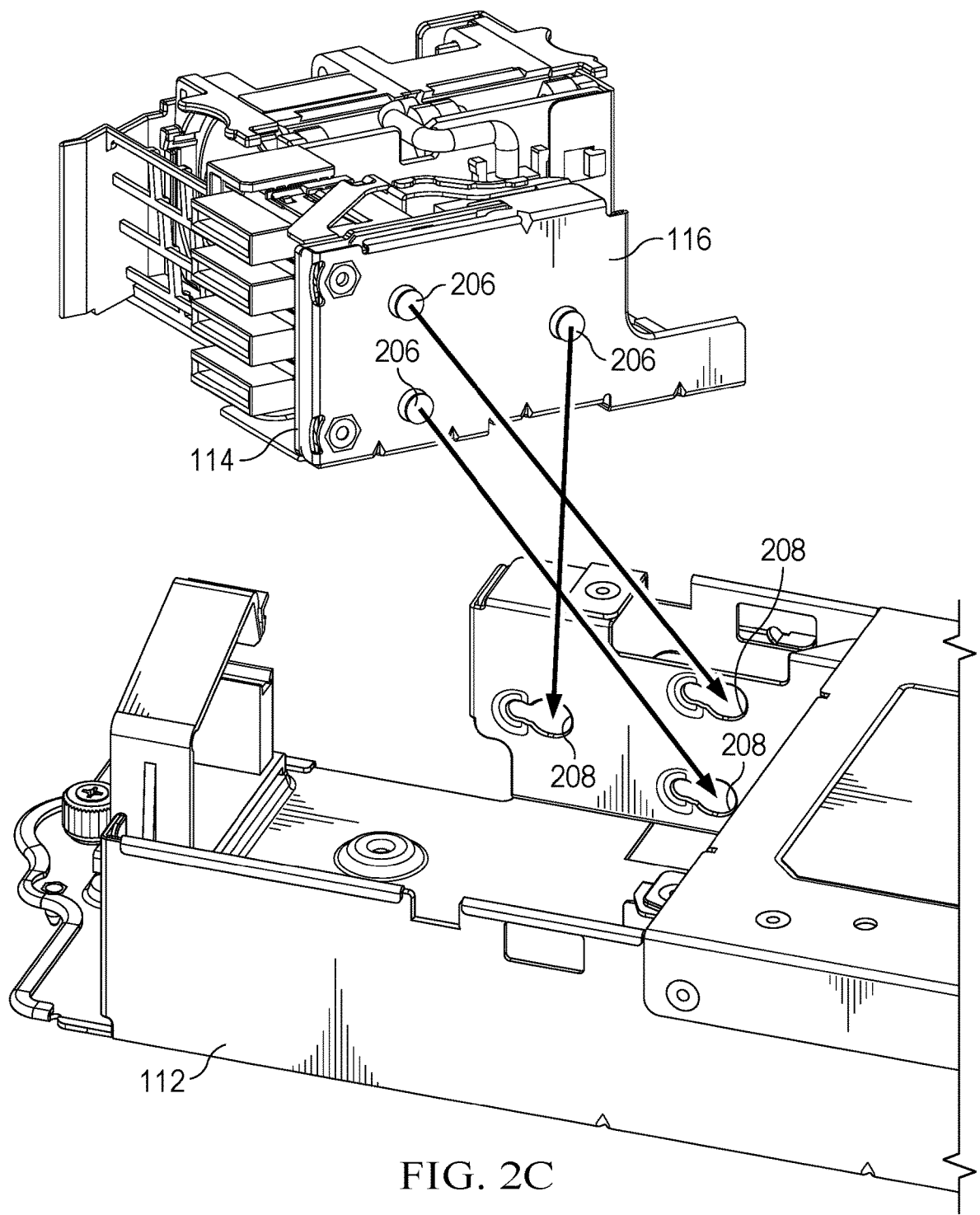
FIG. 2C illustrates another isometric exploded perspective view of selected components of an example drive backplane assembly, in accordance with embodiments of the present disclosure.

FIG. 2C illustrates another isometric exploded perspective view of selected components of an example drive backplane assembly, in accordance with embodiments of the present disclosure. As shown in FIGS. 2B and 2C, various components of the drive backplane assembly may have mechanical features to enable tool-less assembly and disassembly of the drive backplane assembly. For example, backplane/air mover module 202 may have engagement features 206 (e.g., T-pins with a circular shape and T-shaped from their side profile) formed on a surface thereof for mechanically engaging with slotted openings 208 (e.g., in the shape of two overlapping circles of different diameter) formed through or on a surface of drive backplane tray 112.

With backplane/air mover module 202 being easily separable from the overall drive backplane assembly, the most complicated task—attaching or detaching cable 118—in servicing the drive backplane assembly may be separated from the rest of the drive backplane assembly, allowing technicians to install and remove the drive backplane assembly and/or component 106 into/from chassis 101 freely.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:
a processor coupled to a motherboard;
a connector mounted to the motherboard; and
a drive backplane assembly comprising:
 a drive backplane tray; and
 a module configured to be mechanically coupled to the drive backplane tray in a tool-less manner, the module housing a backplane configured to receive and couple to a plurality of storage drives, and the backplane comprising a cable having a fixed connection to the backplane wherein the cable is configured to couple to the connector.

2. The information handling system of claim 1, wherein the module is also configured to house an air mover.

3. The information handling system of claim 2, wherein the drive backplane assembly further comprises an air shroud configured to be mechanically coupled to the drive backplane tray in a tool-less manner.

4. The information handling system of claim 1, further comprising an information handling resource component configured to, when the information handling system is fully assembled, reside proximate to the connector and between the connector and the drive backplane assembly.

5. A drive backplane assembly comprising:
a drive backplane tray; and
a module configured to be mechanically coupled to the drive backplane tray in a tool-less manner, the module housing a backplane configured to receive and couple to a plurality of storage drives, and the backplane comprising a cable having a fixed connection to the backplane wherein the cable is configured to couple to a connector mounted to a motherboard.

6. The drive backplane assembly of claim 5, wherein the module is also configured to house an air mover.

7. The drive backplane assembly of claim 6, further comprising an air shroud configured to be mechanically coupled to the drive backplane tray in a tool-less manner.

8. A method comprising:
mechanically coupling a module of a drive backplane assembly to a drive backplane tray of the drive backplane assembly in a tool-less manner, wherein the module houses a backplane configured to receive and couple to a plurality of storage drives; and
coupling a cable having a fixed connection to the backplane to a connector mounted to a motherboard prior to mechanically coupling the module of a drive backplane assembly to the drive backplane tray.

9. The method of claim 8, wherein the module is also configured to house an air mover.

10. The method of claim 9, further comprising mechanically coupling an air shroud to the drive backplane tray in a tool-less manner.

* * * * *